Figure 1:
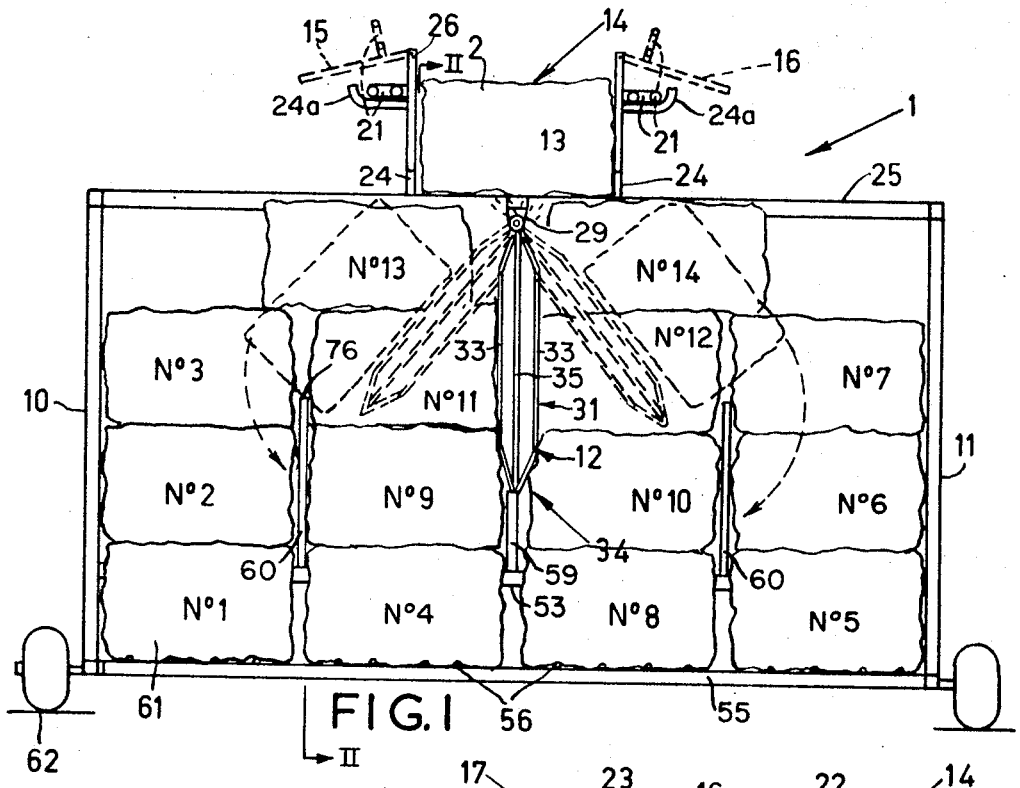

United States Patent [19]
Taylor

[11] 3,746,186
[45] July 17, 1973

[54] BALE CARRYING AND STACKING APPARATUS

[76] Inventor: Philip Thomas Taylor, Southbridge, Canterbury, New Zealand

[22] Filed: July 8, 1971

[21] Appl. No.: 160,711

[52] U.S. Cl. ............................... 214/6 B, 214/6 DK
[51] Int. Cl. ............................................ B65g 57/32
[58] Field of Search .................. 214/6 B, 6 DK, 6 P

[56] References Cited
UNITED STATES PATENTS

| | | | |
|---|---|---|---|
| 3,400,839 | 9/1968 | Jay et al. | 214/6 B |
| 3,501,025 | 3/1970 | Jay et al. | 214/6 B |
| 3,158,270 | 11/1964 | Prentice | 214/6 B |
| 3,370,719 | 2/1968 | Oler | 214/6 B |
| 3,375,940 | 4/1968 | Thompson et al. | 214/6 B |
| 3,512,659 | 5/1970 | Vanderkrogt | 214/6 B |

Primary Examiner—Robert J. Spar
Attorney—Dawson, Tilton, Fallon & Lungmus

[57] ABSTRACT

This invention relates to an apparatus for stacking and carrying bales of hay and the like, comprising a carrier with bales stacking apparatus, the apparatus having an articulated stacking arm which is capable of directing bales into the carrier; the arrangement being such that when bales are stacked in the carrier, the bales lies substantially side by side in rows with at least one row being stacked on top of another row.

7 Claims, 6 Drawing Figures

Patented July 17, 1973     3,746,186

2 Sheets-Sheet 1

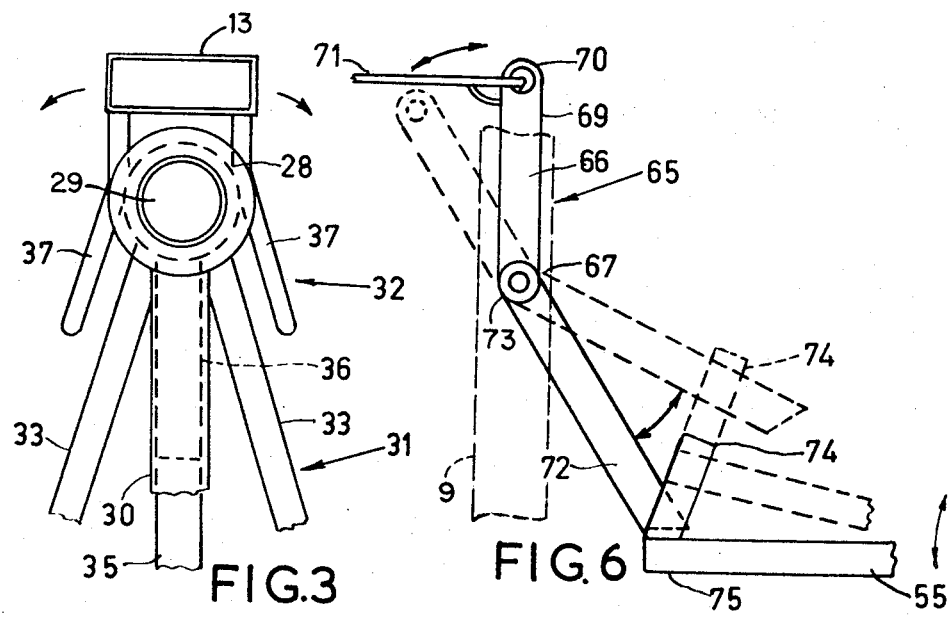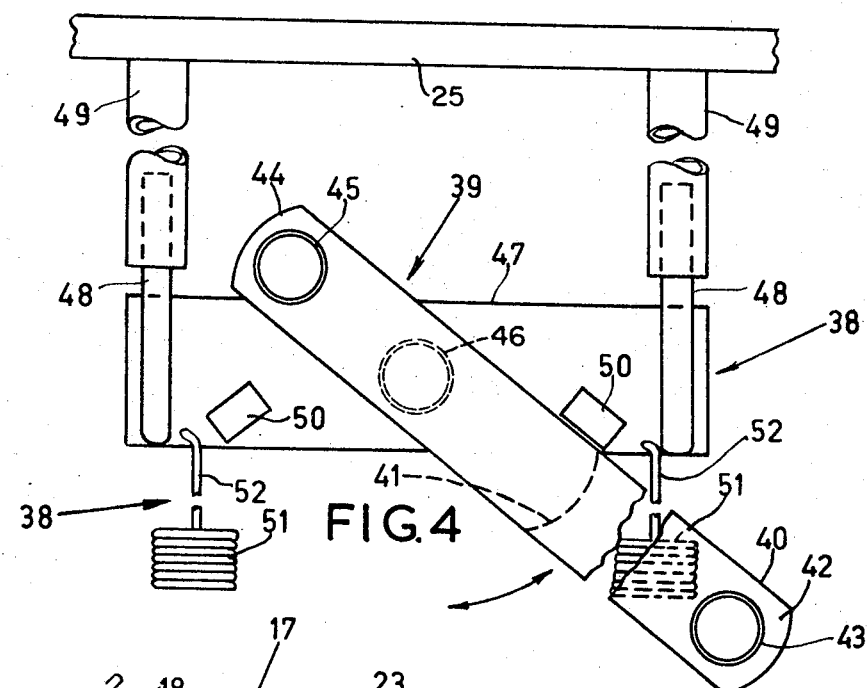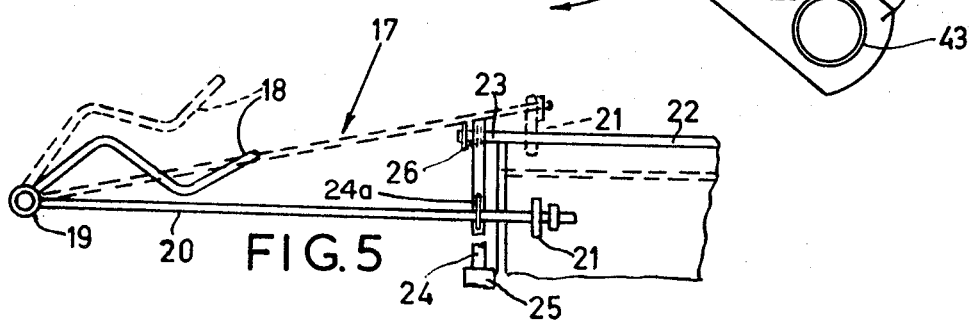

BALE CARRYING AND STACKING APPARATUS

This invention relates to apparatus which stacks bales or like articles in an orderly sequence and then releases the bales in their stacked condition.

An object of the invention is to provide a carrier with bale stacking apparatus, which apparatus is of simple construction whilst being capable of receiving and stacking bales in an orderly sequence on a deck of the carrier; and which said carrier is capable of releasing bales in their stacked condition.

Another object of the invention is to provide a robust efficient carrier with bale stacking apparatus in which power driven components are not required for stacking or releasing the bales.

Another object of the invention is to provide a carrier with bale stacking apparatus which is capable of being towed behind a bale making machine or baler, the arrangement being such that the stacking apparatus is capable of receiving the bales being produced and stacking them in sequential order in the carrier.

According to this invention there is provided a bale carrying and stacking apparatus comprising a carrier having a fixed front and rearwardly extending side walls, three divider walls extending rearwardly from the front wall and dividing the carrier transversely into four single bale width compartments, and a deck between the front and side walls and on which bales can be stacked; a stacking arm having a main arm section extending rearwardly from the front wall and depending from a medial pivot connection at an upper part of the carrier for transverse pivoting movement and so as to align with the centre divider when at bottom dead centre, the centre divider being shorter in height than other two dividers; there being biasing over-centre means to normally bias the stacking arm laterally in one direction or the other and the arrangement providing for bales to be passed singly onto an upper edge of the arm and released to gravitate down the arm into the respective carrier compartments, the arm directing bales to one side to fill the outer side compartment to which it is directed and permitting a next single bale to pass into the next inner compartment and actuate the over-centre means whereby the arm is moved to the opposite side of the carrier to direct bales to fill the opposite outer side compartment to which it is now directed and permit a next single bale to pass into the remaining inner compartment and at least a further single bale to enter each inner compartment in stacking bales in side by side relationship; and there being means to effect removal of the bales in stacked relationship from the carrier.

Figure 2:
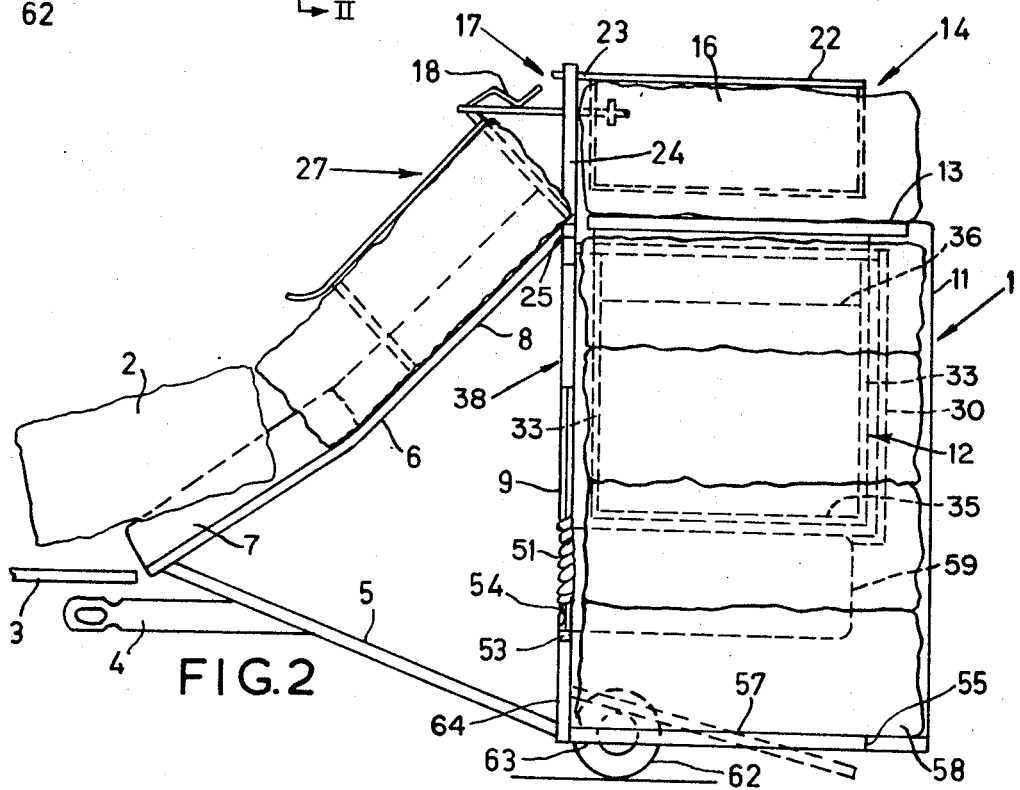

A preferred form of the invention will now be described, by way of example, with reference to the accompanying drawings in which:

FIG. 1 shows a rear view, partly diagrammatic, of a carrier arranged to receive and stack up to 14 bales, FIG. 2 shows a sectional and diagrammatic side view of the carrier, on line II—II of FIG. 1, FIG. 3 shows a detailed fragmentary rear view of the upper section of the stacking arm, FIG. 4 shows a detailed fragmentary front view of over centre biasing means for the stacking arm, FIG. 5 shows a detailed fragmentary view of bale retaining mechanism for the stacking apparatus and FIG. 6 shows a detailed view of release and tilting mechanism for the carrier deck.

The carrier 1 may be normally trailed behind such as a hay baler (not shown) which thrusts the bales rearwardly and longitudinally onto a platform 3 as they are being formed. The said carrier 1 is provided with a tow bar 4 for securing the carrier 1 to the rear of the baler. The tow bar structural members 5 are conveniently utilised to support the lower end of a rearwardly and upwardly extending receiving ramp 6, which ramp 6 is capable of receiving the bales 2 being produced by the baler. The lower end of the receiving ramp 6 is aligned with the baler platform 3 for the purpose of receiving the bales 2, while the upper end of the ramp 6 is situated medially adjacent the carrier top. The ramp 6 is supported by structural members 8 which in turn are secured at their lower ends to, and supported by, the tow bar structural members 5 while the upper ends of the members 8 are secured to the front wall 9 of the carrier 1. The carrier 1 is open at the top and rear, and has a vertical transverse front wall 9 with vertical side walls 10 and 11 extending rearwardly from the front wall 9 for at least a bale length. The completed bales 2 which have been ejected from the baler are pushed up the ramp 6 by the thrust of each consecutive bale 2 being produced. To guide the bales 2 up the ramp 6, retaining walls 7 are provided on each side of the ramp 6 and spaced according to bale width. It will be seen from the above, that the completed bales 2 are urged rearwardly up the ramp 6 to an elevated position adjacent the top of the walls 9, 10,11 of the carrier. The bales 2 are then progressively urged rearward from their elevated position into the carrier 1 and stacked in sequential order by an articulated stacking arm 12.

As each bale 2 reaches the top of the ramp 6 it is pushed rearwardly by an oncoming bale 2 onto the upper horizontal edge 13 of the stacking arm 12. When the bale is in the position, indicated by arrow 14, it is horizontally disposed and ready to be dispatched into the carrier. The bale 2 is momentarily held in this position 14 by two retaining flaps 15,16, which are capable of being released or locked by a linkage mechanism, indicated by arrow 17 in FIG. 2 and shown more particularly in FIG. 5. A trigger 18 of the mechanism 17 is operated by an oncoming bale 2 as the oncoming bale 2 reaches the top of the ramp 6. The trigger 18 is preferably secured to a horizontal cross-bar 19 which is pivotally mounted at the top of the retaining walls 7 of the ramp 6. Also secured to the cross-bar 19 adjacent the cross-bar ends are rearwardly extending levers 20 which are capable of locking the bale retaining flaps 15,16. At the rear distal end of each lever 20, a substantially laterally disposed link 21 is provided which links the lever 20 with its respective flap 15 or 16. Each link 21 is pivotally secured to both the lever 20 and the outer surface of the respective retaining flap 15 or 16. Each flap 15,16 is provided with a projecting horizontal top member 22 which is pivotally secured by a projection 23 to an upright member 24 projecting upwardly from the carrier top cross-member 25. The flap projection 23 is secured in a bearing 26 at the top of the upright member 24. A stop or harness 24a with an upstanding projection at its outer end projects laterally outwards from each upright member 24 and below the respective linkage lever 20 when the flap 15,16 is in the "closed" position, the lever 20 being adjacent the base and end projection of the harness 24a. When a bale 2 in position 14 tends to press against either one flap 15, or the other 16, the harness 24a prevents the respective lever 20 and thus the flap 15,16 with which it is engaged from moving outwardly, and therefore, the bale 2 is retained in position. When an oncoming bale reaches the top of the ramp, indicated by arrow 27, the trigger 18 is operated, thus lifting the levers 20 upwardly out of their respective harnesses 24a and opening the bale retaining flaps 15,16 outwardly. Once the flaps 15,16, are open, the bale 2 in position 14 is able to slide down the stacking arm 12. Before the oncoming bale which was in the position indicated by the arrow 27 reaches the position 14 at the top of the stacking arm 12 in flap linkage mechanism 17 returns to a "locked" position, and thus, the trigger 18, requires to be operated by the next oncoming bale in position 27 before the retaining flaps 15,16 will re-open.

In one form of the invention, the stacking arm 12 is pivotally mounted in the carrier 1, substantially medially thereof, adjacent the top of the front wall 9 of the carrier. The arm 12 is mounted on bearings such as at 28 on a preferably rearwardly disposed horizontal shaft 29. The forward end of the horizontal shaft 29 is located in a sleeve bearing in the front wall 9 of the carrier 1 and the rear end of the shaft 29 is located in a bearing 28 to a substantially upright column 30 at the rear of the carrier 1 (this rear end part being omitted from FIG. 1 but shown in FIG. 3), and extending upwardly from the rear end of a medial dividing wall 59. The arm 12 is capable of pivoting about the horizontal shaft 29 to either the right or left hand side of the carrier 1. When the stacking arm 12 is deflected to the right hand side of the carrier 1, the horizontal upper edge 13 of the arm 12 is situated to the left of the carrier 1 centre line, and conversely, when the stacking arm 12 is deflected to the left hand side of the carrier 1, the horizontal upper edge 13 of the arm 12 is situated to the right of the centre line of the carrier 1. It will thus be seen that when a bale 2 is in a substantially horizontal position 14 on the upper edge 13 of the stacking arm 12, the centre of gravity of the bale 2 will cause the bale 2 to topple, when it is released, in the direction in which the stacking arm 12 is deflected. It will be understood that the bale 2 will slide down the upper surface of the arm 12 to a position in the carrier.

Initially, when the carrier 1 is being filled, the bales 2 are dispatched along one side or other of the main depending section 31 of arm 12 into their appropriate positions in the carrier; however, eventually the main arm section 31 becomes locked between stacked bales 2 when the carrier 1 is almost full. Once the main arm section 31 is locked, an articulated upper section 32 of the arm 12 dispatches the last few bales 2 into the right and left hand side of the carrier 1. The bale dispatching sequence of the arm 12 will be described in later paragraphs.

The main arm section 31 of the stacking arm 12 is provided with sets of left and right hand arch-shaped runners 33 down either of which sets of runners 33 the bales 2 are capable of sliding or gravitating. The reason for the runners being arch-shaped is that the bales 2 press on the arch and assist in causing the arm 12 to pass through the bottom dead centre position, indicated by arrow 34. The runners 33 may be secured at their upper and lower ends to a substantially U-shaped frame 35 of the main arm section 31. A short strengthening plate or web 36 is provided to strengthen the frame of the main arm section 31. An upper section 32 of the arm 12 is provided, which is also pivotally secured to the same shaft 29 as the main arm section 31. The top edge of the upper arm section 32 is provided with the aforementioned edge 13 of the stacking arm 12 on which the bales 2 initially rest before they are dispatched into the carrier 1. Once the main arm section 31 is locked between bales of hay, the upper arm section 32 is still free to pivot to the right or left relative to the main arm section 31. The upper arm section 32 is provided with left and right laterally disposed plates 37 which plates 37 limit the articulate movement of the upper arm section 32 relative to the main arm section 31 when such upper section 32 is directing the last bales 2 entering the carrier 1 into either the left or right hand side of the carrier 1 as hereinafter described.

In the preferred form of the invention an over-centre spring actuating mechanism, indicated by arrow 38 in FIG. 2 and shown more particularly in FIG. 4 of the accompanying drawings, is provided to deflect the stacking arm main section 31 to either the right or left hand side of the carrier 1. The spring assembly 39 of the mechanism 38 is mounted substantially medially on the front wall 9 of the carrier 1 adjacent the main section 31 of the stacking arm 12 and connecting linkages 40,41 are provided to connect the main arm section 31 with the spring assembly 39. One long link 40 is pivotally connected at its lower end 42 to a pivot pin 43 on the lower end part of the stacking arm 12 while the upper end 44 of the long link 40 is pivotally secured by a pivot pin 45 to the upper end of a short link 41 which link 41 is disposed to the rear of long link 40 and in turn is pivotally secured at its medial area to a pivot pin 46 on a sliding plate 47 of the spring assembly 39; all pivot pins 43,45 and 46, have their axes parallel with the stacking arm shaft 29 or main pivot axis for movement of the links 40,41 in a transverse plane. The short link 41 is interposed between the longer link 40 and the sliding plate 47, and the purpose of the short link 41 is to increase the sensitivity of the over-centre mechanism 38 when the stacking arm 12 is at bottom dead centre (as indicated by the arrow 34 in FIG. 2). The sliding plate 47 of the mechanism 38 is disposed transversely of the carrier 1 and is provided with two parallel round bars 48 which extend upwardly at either side of the plate 47 and are slidably located in sleeves 49 which sleeves 49 are secured to and depend from the upper cross member 25 of the carrier front wall 9, so that the plate 47 and pivots 45 and 46 are below the stacking arm pivot shaft 29 and the pivot 46 is on the carrier 1 and stacking arm 12 centre line. The sliding plate 47 is provided with two stops 50 on its front face and which stops 50 limit the turning arc of the short link 41, which turning arc in turn limits the turning area of the stacking arm 12.

Two parallelly disposed tensioning springs 51 are provided which are secured to the sliding plate 47 at the spring upper ends 52 and secured to a crossmember 53 of the front wall 9 at the spring lower ends 54; the arrangement being such that the sliding plate 47 is normally urged downwardly. The short link 41, which is pivoted to both the sliding plate 47 and the long link 40, is thus urged to exert a downward pressure at the upper end 44 of the long link 40, causing the lower end 42 of the link 40 to move laterally, and because of its pivot 43, in an arc with the arm 12 to either the left or right hand side of the carrier 1. This pressure caused by the springs is therefore transmitted to the stacking arm 12 to urge the arm 12 to move in an arc to either the right or left of centre. The runners 33 along which the bales 2 slide are arched as indicated earlier, in order to ensure that the radial axis of the arm 12 is urged over-centre by certain bales 2 being dispatched into the carrier 1. When the arm 12 moves over-centre by a certain amount (for example by a few degrees), the pivot pin 45 connecting the links 40, 41 is caused to move over-centre in the opposite direction by a substantially corresponding equivalent amount, thus urging the long link 40 to a laterally disposed position relative to the arm 12. In this laterally disposed position, the link 40 is capable of exerting a greater lateral pressure to move the arm 12 than would otherwise be the case if the short link 41 had not carried the pivot 45 over-centre to dispose the long link 40 laterally.

The carrier 1 is provided with a deck 55 with a series of runners 56 on which the lowest row of stacked bales 2 rest. These runners 56 are parallel and disposed rearwardly in order that the bales 2 may slide down the runners 56 onto the ground surface. The length of the deck 55 is marginally shorter than the length of the bales 2 and carrier side walls 10 and 11, and the deck 55 is pivotally supported on aligned pivots 57 at the bases of the side walls 10, 11 so that it can tip rearwardly about a transverse pivot axis to dispatch the stacked bales 2 onto the ground surface. When the deck 55 is tipped, the rearmost bottom corner 58 of the bottom row of bales 2 make frictional contact with the ground surface and cause the stacked bales 2 to hold on the ground surface and slide rearwardly from the carrier 1. To assist in stacking the bales 2 in sequential order in the carrier 1, three equally and bale width spaced divider walls 59, 60 are provided which cause the bales 2 to stack neatly in four columns. The divider walls 59, 60 are disposed in the vertical planes and extend rearwardly from the front wall 9 above and clear of the deck 55. A short centre divider 59 is provided which has sufficient clearance from the lower end of the stacking arm 12 to permit the arm 12 to swing to left or right of centre. The outer dividers 60 are of a sufficient height to retain three bales 2 in position. The first second and third bales 2 of each outer column 61 are therefore guided and retained by the outer dividers 60 to be stacked one on top of the other. The outer side walls 10, 11 of the carrier 1 are of a sufficient height to hold a column 61 of four bales, although, the stacking arm 12 is not normally capable of stacking a fourth bale on top of the three bales in the outer columns 1. The carrier 1 is supported by two ground wheels 62 which are rotatably secured to the carrier 1 adjacent the forward lower corners 63.

At the bottom centre (FIG. 2) of the front wall 9, tripping mechanism 65 (which is, in this form of the invention hand operated and, shown more particularly in FIG. 6) is provided for tripping the deck 55 of the carrier 1 once the carrier 1 is fully loaded with bales 2. The tripping mechanism includes an angled trip lever 66 which is pivoted at its centre by pivot pin 67 to a lower frame member of the front wall 9 for movement in a fore and aft vertical plane. The upper end 69 of the lever 66 is provided with a hole 70 in which a forwardly extending pull rod or wire 71 is attached for effecting movement of lever 66, and the lower end 72 of the lever 66 is capable of locking the deck 55 in the "untilted" position. A torsion spring 73 is provided on the pivot pin 67 to urge the latching lever 66 into its normally locked or untilted position. A U-shaped hoop 74 may be provided on forward end of the deck 55 and which hoop 74 straddles the lower end 72 of trip lever 66. When the lever 66 is tripped, by pulling the pull wire 71, the lower leg 72 of the lever 66 lifts into the back of the hoop 74 and urges the forward end 75 of the deck 55 to raise thus ensuring that the deck 55 tilts positively when the trip lever 66 is pulled.

The stacking sequence of the bales 2 is as follows. The bales 2 produced by the baler consecutively push the completed bales 2 end-to-end up the ramp 6 to the elevated position at the top of the carrier 1. When each bale 2 is in the elevated position 14, it is supported horizontally in this position by the upper edge 13 of the stacking arm 12 and the retaining flaps 15, 16 on either side of the bale 2. When the next oncoming bale 2 reaches the top of the ramp 6 it trips the trigger 18 of the retaining flap locking mechanism 17; the flaps 15, 16 are then caused to move outwardly and the bale in the elevated position 14 is then free to slide or gravitate down the stacking arm 12. If the arm 12 is disposed to the left of the carrier 1, the upper edge 13 of the arm 12, on which the bale No. 1 is resting, will be over-centre to the right of the carrier 1. The centre of gravity of the bale No. 1 causes the bale 2 to tumble to the left and gravitate down the uppermost runners 33 of the arm 12 into the left hand side of the carrier 1. The lower end of the arm 12 is disposed adjacent the left hand outer divider 60 and bale No. 1 thereon is directed towards the outer space between the outer left hand wall 10 and the outer left hand divider 60. The bale No. 1 then strikes the upper edge 76 of the divider 60 then tumbles over to drop down onto the deck 55 in a horizontal position. Meanwhile, the No. 2 bale is rising beyond the upper edge of the ramp 6 and is moved rearwardly into horizontal position 14. As No. 2 bale is moved rearwardly, the trigger 18 for operating the retaining flaps 15, 16 is released and the retaining flaps 15, 16 instantly close to momentarily contain bale No. 2. Every oncoming bale is likewise momentarily held in position 14 at the top of the stacking arm 12 before it is dispatched into the carrier 1. The purpose of momentarily containing the bales in this elevated position 14 is to ensure that the bales are horizontally disposed before they are released to gravitate down the stacking arm 12, thus ensuring that the bales stack horizontally in the carrier. Bale No. 2 is dispatched down the stacking arm 12 to tumble over edge 76 into the left hand outer space of the carrier to take up its position on top of the bale No. 1; and bale No. 3 similarly gravitates down the stacking arm 12 and tumbles into position on top of bale No. 2. The movement of bales No. 1, No. 2 and No. 3, down the stacking arm 12 and into the carrier 1 is relatively rapid and thus these first three bales do not exert force on the stacking arm 12 for sufficient length of time to move such arm 12 towards the opposite side of the carrier 1. However, when bale No. 4 gravitates into the left hand side of the carrier 1, it is prevented from entering the outer left hand space by bale No. 3 and thus rests and exerts force on the arm 12 until the arm 12 is moved towards bottom dead centre in permitting bale No. 4 to gravitate into position in the bottom of the inner left hand space of the carrier 1. In gravitating into position, bale No. 4 urges the stacking arm 12 over-centre to take up position on the right hand side of the carrier 1.

In a similar manner to that described for bales No. 1, No. 2 and No. 3, bale No. 5 now travels down the stacking arm 12 right hand runners 33, which are now uppermost, and is dispatched to tumble into the outer right hand space of the carrier, and bales No. 6 and No. 7 follow bale No. 5 to tumber into the right hand outer space. As with bale No. 4, bale No. 8 is prevented from entering the outer right hand space in the carrier 1 by bale No. 7, and rests on the stacking arm 12 until such arm 12 pivots downwardly towards bottom dead centre and permits bale No. 8 to gravitate into the bottom of the carrier inner right hand space and, in so doing, move the arm 12 over centre to again take up position on the left hand side of the carrier 1. Bale No. 9 is then directed to the left hand side of the carrier 1, prevented from entering the outer left hand space by bale No. 3, and rests on arm 12 until permitted to gravitate into position in the inner left hand space on top of bale No. 4. The arm 12 then moves over-centre once again to take up the right hand position and bale No. 10 is similarly dispatched into the right hand inner space on top of bale No. 8.

At this stage, the main arm section 31 is trapped between bale No. 9 and bale No. 10. Bale No. 11 may either gravitate into position in either the right or left hand inner space on top of bale No. 9 or top of bale No. 10. (The position into which bale No. 11 gravitates is normally dictated by the terrain over which the carrier 1 is being towed i.e. if the carrier 1 is tilting to the right the bale No. 11 will fall to the right, but if the carrier 1 is tilted to the left, bale No. 11 will fall to the left.) If bale No. 11 has gravitated into the inner left hand space above bale No. 10 (as illustrated in FIG. 1) the left hand plate 37 of the articulated upper arm section 32 will be urged towards the centre and the upper edge 13 of the arm 12 will be disposed to left of centre. When bale No. 12 is released from its elevated position 14, the centre of gravity will cause the bale No. 12 to topple or gravitate to the right, down the right hand plate 37 of the upper arm section 32. No. 13 and No. 14 bales may be similarly dispatched onto the top of the other stacked bales, but no provision is made for positively stacking the last two bales in position. The placing of the last two bales may depend on the prevailing conditions in the farm or establishment where the carrier 1 is being used.

It will be seen from the above description that the carrier fulfills the objects of the invention.

I claim:

1. Bale carrying and stacking apparatus comprising a carrier having fixed front and rearwardly extending side walls, three divider walls extending rearwardly from the front wall and dividing the carrier transversely into four single bale width compartments, and a deck between the front and side walls and on which bales can be stacked; a stacking arm having a main arm section extending rearwardly from the front wall and depending from a medial pivot connection at an upper part of the carrier for transverse pivoting movement and so as to align with the centre divider wall when at bottom dead centre, the centre divider wall being shorter in height than the other two divider walls; there being biasing over-centre means to normally bias the stacking arm laterally in one direction or the other and the arrangement providing for bales to be passed singly onto an upper edge of the arm and released to gravitate down the arm into the respective carrier compartments, the arm directing bales to one side to fill the outer side compartment to which it is directed and permitting a next single bale to pass into the next inner compartment and actuate the over-centre means whereby the arm is moved to the opposite side of the carrier to direct bales to fill the opposite outer side compartment to which it is now directed and permit a next single bale to pass into the remaining inner compartment and at least a further single bale to enter each inner compartment in stacking bales in side by side relationship; and there being means to effect removal of the bales in stacked relationship from the carrier.

2. Apparatus as claimed in claim 1 arranged for location behind a baling machine and having a fixed ramp extending rearwardly and upwardly from a bale outlet of the baling machine to the upper end of the carrier front wall, the ramp being provided with side retaining walls or guides spaced at bale width for guiding bales up the ramp, whereby bales discharged from the baling machine will be urged up the ramp to the upper edge of the stacking arm.

3. Apparatus as claimed in claim 2 wherein rearwardly extending and pivotally mounted depending retaining flaps are disposed at either side of and above the stacking arm so as to be capable of momentarily assisting in retaining each bale in an elevated and substantially horizontal position on the upper edge of the stacking arm prior to despatch into the carrier, there being lever and linkage mechanism connected to the retaining flaps and actuable by trigger mechanism mounted in juxtaposition with the ramp whereby the trigger mechanism is operable by a next succeeding bale at the top of the ramp to move the lever and linkage mechanism and open or pivot outwardly the retaining flaps in permitting the bale on the upper edge of the stacking arm to topple laterally and be despatched into the carrier, the flaps returning to their original depending and bale retaining position as the said succeeding bale is moved beyond the trigger mechanism and onto the upper edge of the stacking arm.

4. Apparatus as claimed in claim 1 wherein the biasing over-centre means for the stacking arm comprises a sliding plate mounted transversely and medially of the carrier in guides at the front wall for movement vertically in a transverse plane, spring bias means for normally urging the sliding plate downwardly, a short link having part extending upwardly from a medial pivot connection with the plate, and a long link having its upper end part pivotally connected to the upper end part of the short link and a lower end part pivotally connected to a lower end part of the stacking arm main section, all pivot connection axes being parallel with the main pivot axis of the main arm section so that the short and long links are movable in transverse planes relative to the sliding plate and carrier and so that the downwardly urged spring plate causes the short link to urge the long link upper part downwardly and the long link itself laterally relative to the stacking arm in urging the stacking arm to either side of the carrier.

5. Apparatus as claimed in claim 1 wherein the stacking arm has a short upper arm section above the main arm section pivot and articulated to the main arm section for limited transverse pivoting movement, the upper arm section being provided with the upper edge on which bales are positioned prior to despatch into the carrier, the articulated upper arm section being still movable transversely when the main arm section becomes trapped between bales occupying the two inner compartments to assist in despatching additional bales into the inner compartment upper parts and above bales filling all four compartments.

6. Apparatus as claimed in claim 5 wherein the articulated upper arm section is provided with laterally disposed plates capable of being contacted by bales passing to either side of the articulated upper arm section so that a bale passing to one side of the upper arm section into the upper part of the carrier inner compartment at that side will cause the upper section to pivot and move the upwardly extending part and upper edge thereof over-centre so that the next succeeding bale passing onto the upper edge will be caused to topple in the opposite transverse direction towards and into the other inner compartment of the carrier.

7. Apparatus as claimed in claim 1 wherein the carrier deck is pivotally mounted for movement about a transverse pivoting axis between the side walls, and releasable locking and tilting means are associated with the deck and one of the carrier fixed walls and whereby the carrier deck may be locked in position whilst bales are stacked within the carrier, or actuated to tilt the deck rearwardly for discharge of stacked bales from the deck and carrier.

* * * * *